June 17, 1930.　　　C. GOTTWALD　　　1,763,775
SUPPORTING MEANS FOR PIPES IN CONDUITS
Filed Aug. 12, 1927

Inventor
Christian Gottwald.
By Knox Hudson & Kent.
Attorneys

Patented June 17, 1930

1,763,775

UNITED STATES PATENT OFFICE

CHRISTIAN GOTTWALD, OF CLEVELAND, OHIO, ASSIGNOR TO THE RIC-WIL COMPANY, OF CLEVELAND, OHIO, A CORPORATION OF OHIO

SUPPORTING MEANS FOR PIPES IN CONDUITS

Application filed August 12, 1927. Serial No. 212,504.

The present invention relates broadly to conduits adapted to house pipe lines, such as steam lines, etc., where such pipe lines are installed beneath the surface of the ground, which is particularly the case in cities.

The object of the present invention is to provide an alignment guide for pipes within underground conduit, to thereby prevent the pipes from displacement with respect to any given position in which they are mounted, which displacement may occur due to expansion or contraction. Often the pipe lines in underground conduits are very long and under expansion and contraction stresses they may twist or buckle out of position. The present invention overcomes this by fixedly retaining the pipe line, but at the same time allowing for expansion and contraction.

Reference should be had to the accompanying drawings forming a part of this specification, in which Figure 1 is a side elevation of a portion of a conduit.

Figures 1, 2, 3:
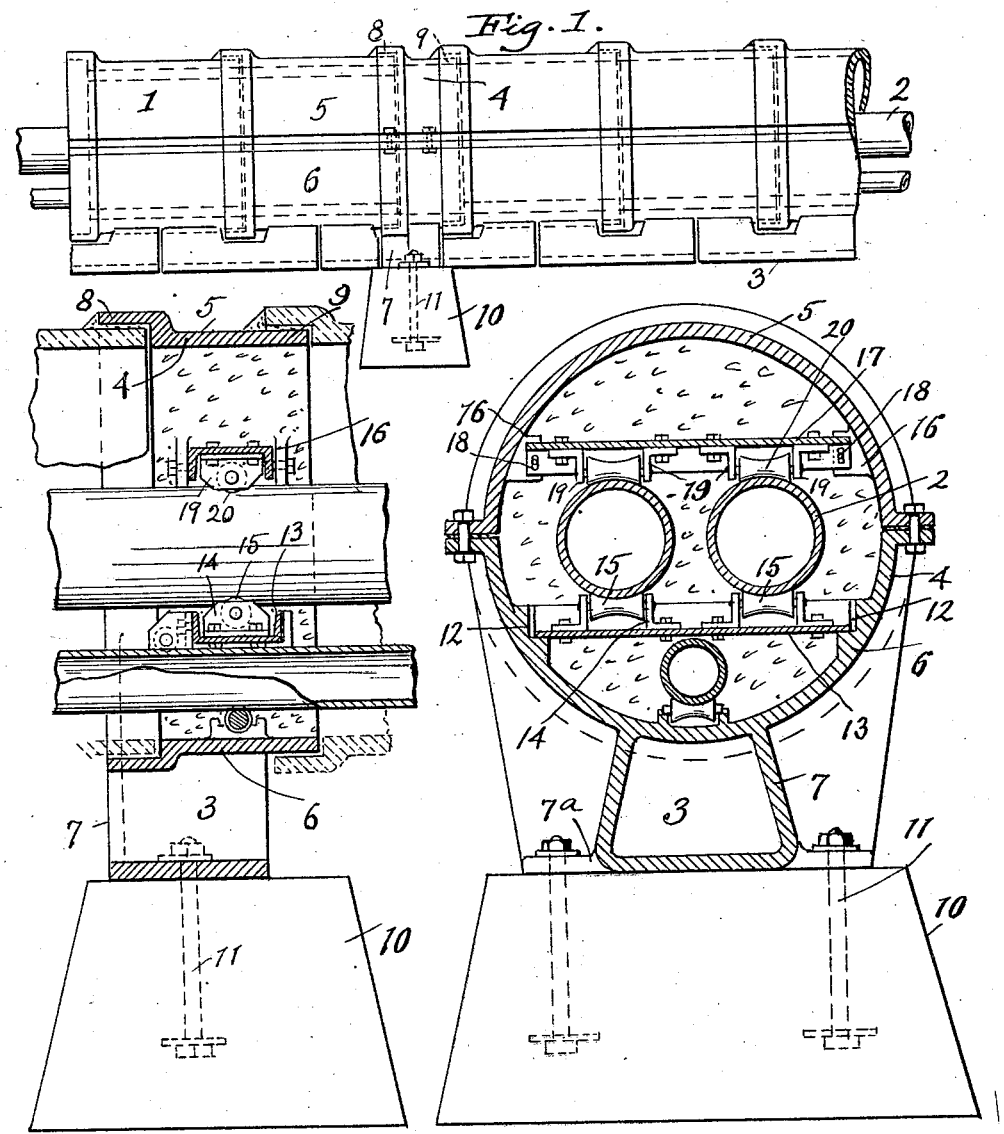
Figure 2 is a sectional elevation of a portion of the conduit, showing the particular supporting means of the present invention.
Figure 3 is a transverse section showing the supporting device of the present invention.

Referring to the drawings, 1 indicates a series of bell and spigot conduit within which is housed pipes such as indicated at 2. Below the conduit are base-drain members indicated at 3, these members being suitably arranged beneath the conduit so that condensation or water collecting within the conduit may discharge through the base-drain. At desired intervals, as for instance approximately every one hundred feet, there is inserted into the conduit an aligning member which is of the construction and arrangement about to be described. This is generally indicated in Figure 1 by the reference numeral 4. Such an aligning member is preferably made of metal, although not necessarily, and comprises an upper section 5 and a lower section 6. The lower section has formed integrally with it, or at least associated with it, a hollow section 7, which, in cross section, is of the same shape as the cross section of the base-drain tile 3. Furthermore, the upper and lower parts 5 and 6 are formed at one end to present a bell end portion 8 and at the other end a spigot end portion 9.

Thus it will be seen that the member which is generally indicated at 4 may be inserted in a conduit in which the individual members are of the usual bell and spigot type of construction.

Preferably each supporting section 4 is suported from beneath upon an independent base, such for instance, as indicated at 10. This may be a concrete block in which retaining bolts 11 are anchored, the same extending through suitable openings provided in a flanged base 7a, which flanged base forms a part of the depending portion 7 before described. Thus each independent section 4 is supported directly on its own foundation or pier.

The lower portion 6 is provided with oppositely disposed shoulders, such as indicated at 12, upon which there is received and supported a transversely extending member 13. Secured upon the member 13 are roller supports 14, which in turn support rollers 15. These rollers 15 are adapted to suport the pipes 2.

The upper sections 5 upon opposite sides are provided with integral ears 16, there being a pair of such ears on each side, and between these ears there is mounted a transversely extending member 17. This member is, for the purpose of being adjustable, provided with slots, as indicated at 18, through which the bolts which secure the member 17 to the ears 16 may pass, the slots permitting a limited adjustment of the member 17.

The member 17 carries roller supports 19, which in turn carry rollers 20 that bear upon the upper portions of the pipes 2. Thus the pipes 2 are supported and held against displacement in a manner which permits their expansion or contraction.

Various modifications and departures from the precise construction shown may be made without departing from the spirit of the invention.

Having thus described my invention what I claim as new is:

1. In a device of the character described, a section adapted to be interposed between the ends of adjacent conduit sections to join them together, said section comprising a lower supporting member and an upper cover member, anti-friction means carried by said supporting member for engaging a pipe to be supported, and means carried by said cover member for engaging said pipe, the combined means serving to support and maintain the pipe in the desired position within the conduit.

2. In a device of the character described, a section adapted to be interposed between the ends of adjacent conduit sections to join them together, said section comprising a lower member and an upper member, a roller carried by said lower member adapted to support a pipe, and a roller carried by said upper member adapted to engage the upper portion of said pipe.

3. In a device of the character described, a section adapted to be interposed between the ends of adjacent conduit sections to join them together, said section comprising a lower member and an upper member, a roller carried by said lower member adapted to support a pipe, a roller carried by said upper member adapted to engage the upper portion of said pipe, and means for securing said upper and lower members together.

4. In a device of the character described, a section adapted to be interposed between the ends of adjacent conduit sections to join the same together, said section comprising a lower member and an upper member, said lower member having longitudinally extending supporting ledges, a transversely arranged carrier mounted on said ledges, anti-friction means mounted in said carrier for engaging a pipe to be supported, said upper member having a transversely extending bar mounted for vertical adjustment therein, and means carried by said bar for engaging a pipe upon the upper portion thereof.

5. In a device of the character described, a section adapted to be interposed between the ends of adjacent conduit sections to join the same together, said section comprising upper and lower halves, means for securing said halves together, an anti-friction roller in the lower half adapted to engage the lower portion of a pipe, and an anti-friction roller in the upper half adapted to engage the upper portion of a pipe, one of said rollers being adjustably mounted in its section half, whereby the pipe may be properly aligned and guided in its longitudinal movement.

In testimony whereof, I hereunto affix my signature.

CHRISTIAN GOTTWALD.